Dec. 23, 1969  W. G. ATWATER  3,485,390
STORAGE SYSTEM WITH A TRANSFER MECHANISM
FOR AN ARTICLE HANDLING VEHICLE
Filed Sept. 25, 1967  6 Sheets-Sheet 1

FIG. 1

INVENTOR.
WAYNE G. ATWATER
BY
Baldwin, Doran & Egan
ATTORNEYS

United States Patent Office 3,485,390
Patented Dec. 23, 1969

3,485,390
STORAGE SYSTEM WITH A TRANSFER MECHA-
NISM FOR AN ARTICLE HANDLING VEHICLE
Wayne G. Atwater, Willoughby, Ohio, assignor to The
Triax Company, Cleveland, Ohio, a corporation of
Ohio
Filed Sept. 25, 1967, Ser. No. 670,064
Int. Cl. B65g 65/02, 60/00
U.S. Cl. 214—16.4                           20 Claims

ABSTRACT OF THE DISCLOSURE

A warehousing system having a plurality of generally parallel extending travel zones with storage bays disposed on one or both sides of each of the travel zones, and with there being provided at least one mechanized load carrier including means for depositing loads into and removing loads from the storage bays. A transfer mechanism is adapted to move along an end of the travel zones and associated storage bays with the transfer mechanism being adapted to receive the load carrier thereon and shift the load carrier from one travel zone to another selected zone, thus providing for servicing by the load carrier of the storage bays associated with the respective travel zone. The transfer mechanism comprises separate upper and lower assemblies with power means on one of the assemblies for driving the same. The upper assembly is cantilever mounted on the storage frame and the transfer assemblies are kept in synchronism with one another during movement of the transfer mechanism by means extending between the upper and lower assemblies and connecting the same.

---

This invention relates in general to automatic warehousing systems for storing or unstoring loads by transferring them between a movable load carrier and a storage frame, and more particularly relates to a warehousing system comprised of a plurality of storage bays or storage sections and including a transfer mechanism adapted to receive the load carrier so that the latter can service a plurality of the storage bays and can be readily moved from one travel zone to another travel zone in the warehousing system.

In the copending U.S. patent application of Joseph Krusinski, Ser. No. 578,020, filed Sept. 8, 1966, now U.S. Patent No. 3,432,046, there is disclosed a warehousing system for storing or unstoring loads having a plurality of travel zones servicing a plurality of storage racks or bay sections, and with a gantry-like transfer framework for transferring a load carrier from one travel zone or aisle to another travel zone or aisle, so that the load carrier can service a plurality of the aisles and associated storage rack sections.

The present invention provides a warehousing system of the above-discussed type which includes a plurality of travel zones or aisles with storage sections or bays disposed on one or both sides of each of the travel zones and wherein there is provided at least one load carrier for servicing a plurality of the travel zones or aisles of the warehousing system. Guiding means is provided in each travel zone adapted for coaction with the load carrier for guiding the movement of the load carrier in the associated travel zone. The load carrier is transferable from one travel zone to another travel zone by a novel transfer mechanism comprising separate upper and lower members connected together by squaring means for synchronous movement from alignment with one travel zone to alignment with another travel zone, and wherein the transfer mechanism is supported on its lower portion by track means extending alongside the storage area and on its upper portion is supported in cantilever fashion by the leading end of the framework of the storage sections, and with at least one of said upper and lower portions of the transfer mechanism having shiftable means thereon for supporting and/or guiding the load carrier when it is disposed in carried relationship on the transfer mechanism, so that the transfer mechanism can be interlocked with the storage frame at the selected travel zone into which the load carrier is to be discharged, thus providing positive alignment of the load carrier with the selected travel zone and the guiding means for the load carrier, in said selected travel zone, for expeditious movement of the load carrier from the transfer mechanism into the selected travel zone.

Accordingly it is an object of the present invention to provide a novel warehousing system.

Another object of the invention is to provide a novel warehousing system which includes a plurality of storage bays or sections defining a plurality of travel zones therebetween in which a load carrier is movable for inserting loads into or removing loads from the storage bays, and wherein novel transfer means is provided for transferring the load carrier from one travel zone to another travel zone, for servicing of the storage bays associated with each respective travel zone.

A still further object of the invention is to provide a novel warehousing system which includes a plurality of storage bays and a travel zone alongside each of the storage bays, and with the storage bays being serviced by at least one powered load carrier movable in the travel zones for inserting loads into or removing loads from the storage bays, and wherein novel transfer means is provided for expeditiously transferring a load carrier from one travel zone to another travel zone, thus providing for the servicing of a plurality of the travel zones by a single load carrier, and including means on the transfer means for interlocking the transfer means with the selected travel zone for expeditious discharge of the transported load carrier from the transfer means into the selected travel zone.

A still further obect of the invention is to provide a novel warehousing construction adapted for servicing by a load carrier movable in spaced parallel extending aisles between bays of storage bins in the warehousing system, and wherein a novel transfer mechanism is provided for receiving the load carrier and transferring it from one aisle to another aisle so that the load carrier can expeditiously move in a plurality of the aisles and thus service a plurality of the bays of storage bins, and with such transfer mechanism including completely separate upper and lower sections connected together by squaring means for synchronizing the movement of the upper and lower sections with respect to one another during the movement of the transfer mechanism along the entranceways of the aisles of the warehousing system.

Another object of the invention is to provide a novel load carrier for a warehousing system.

Other objects and advantages of the invention will be apparent from the following description taken in conjunction with the accompanying drawings wherein:

Referring now to the drawings, the warehousing system may comprise a plurality of generally parallel storage bay sections 12, 12a, 14, 14a, 16, 16a, and so on, defining between each pair thereof (in the embodiment illustrated) an aisle or travel zone 22 so as to permit a motorized load carrier indicated generally at 24 to be moved along the aisle or travel zone and to insert a load into or withdraw a load from the load supoprt means or storage bins 26 formed by the storage bays.

Figure 1:
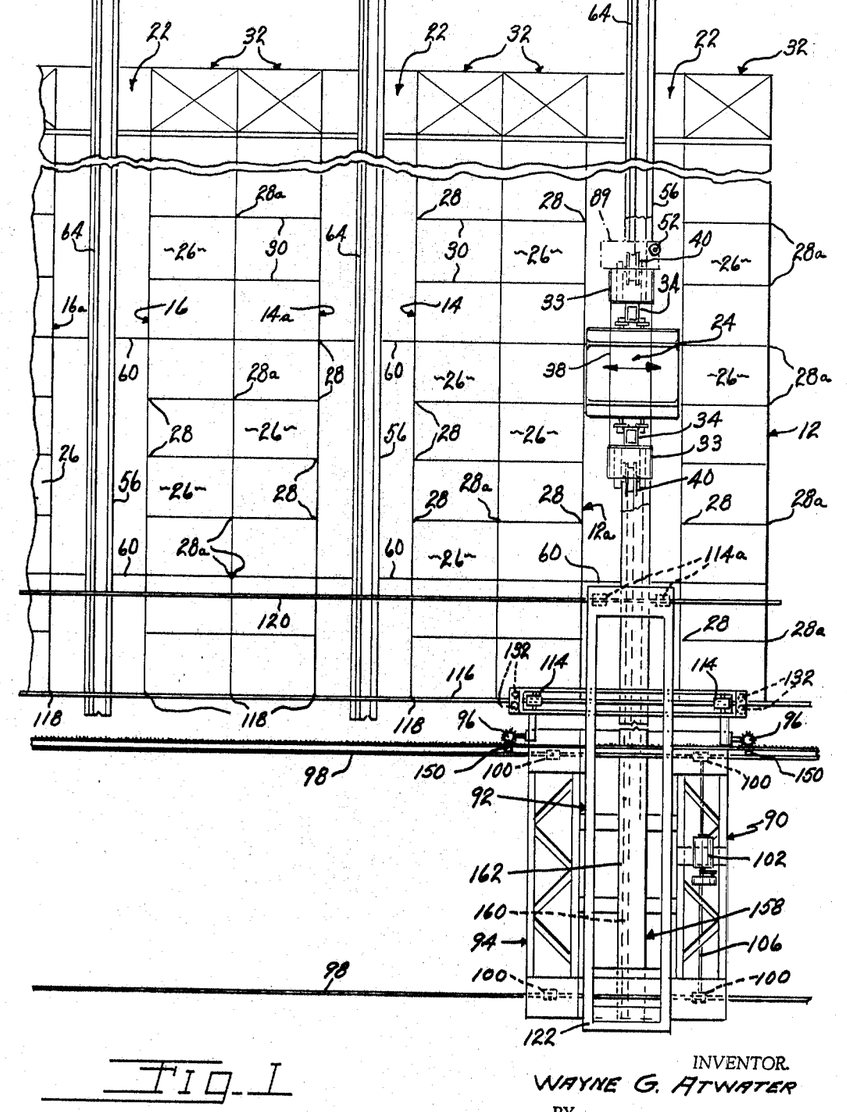
FIGURE 1 is a top plan generally diagrammatic illustration of a warehousing system embodying the present invention.
Figure 2:
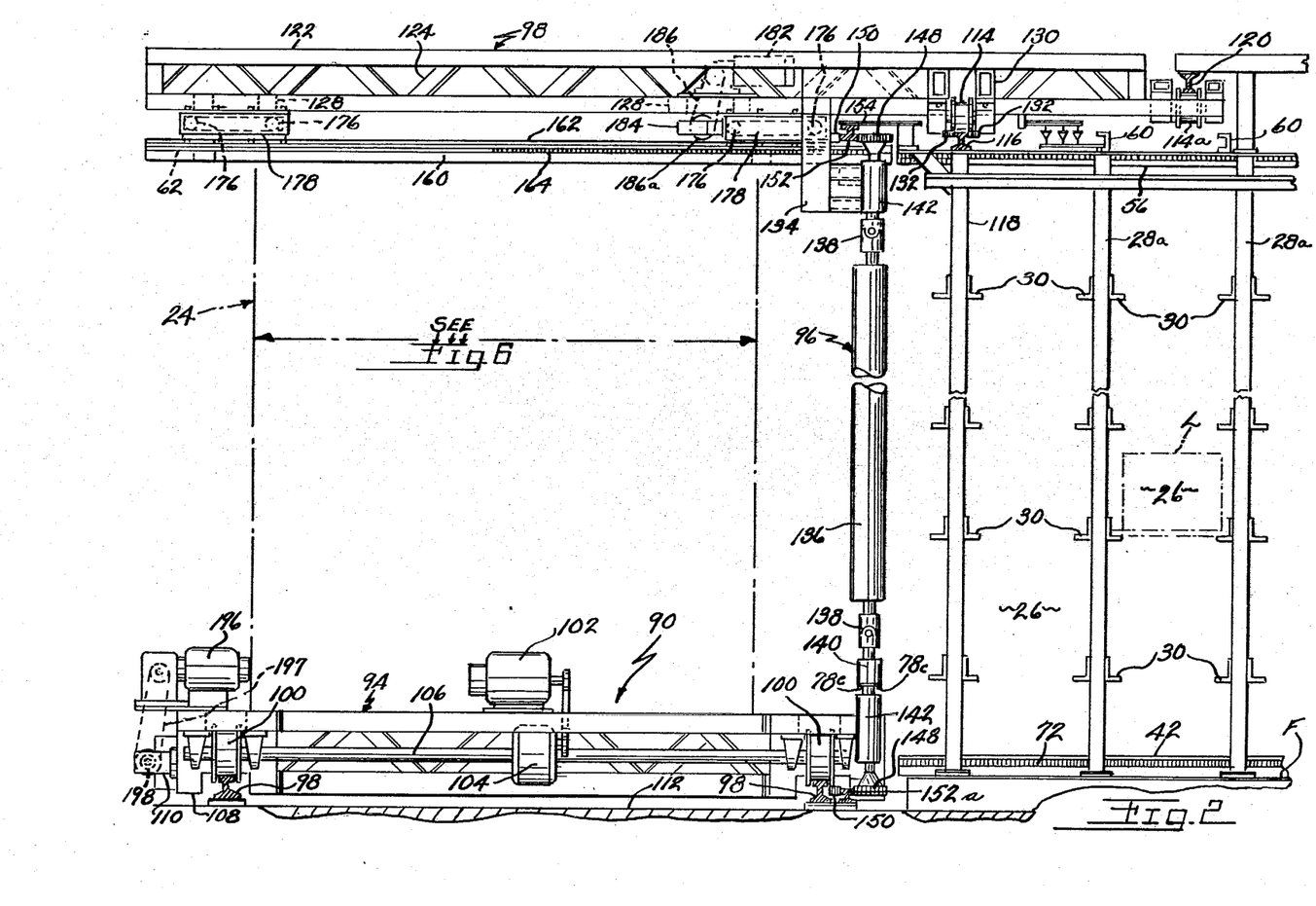
FIGURE 2 is an enlarged, fragmentary side elevational view illustrating in particular the transfer mechanism for receiving the load carrier of the warehousing system and moving it from one travel zone in the warehouse to another travel zone.

Each storage bay may be constructed of a plurality of vertically extending laterally-spaced posts 28, 28a spaced apart by a plurality of generally horizontally-extending, load-supporting rails 30 (FIGURE 2) defining a plurality of the aforementioned storage bins. The storage frame construction may be of the general type disclosed in assignee's copending U.S. patent application, Ser. No. 484,845, filed Sept. 3, 1965, in the name of Anthony R. Chasar and entitled Automatic Warehousing System, and reference may be had thereto for a more detailed discussion of structural details of a warehousing storage frame.

Disposed at one end of preferably each of the storage bay sections 12 through 20a there may be provided a pickup and discharge station 32 which is adapted for receiving load to be handled by the load carrier 24 prior to moving a load into the travel zone by the load carrier, and for receiving a load from the load carrier after such load has been removed from a selected bin by the load carrier and returned to the pickup and discharge station. The load carrier may also pick up a load in one storage bay section and transfer it to another storage bin in the same storage bay section or to a bin in another storage bay section.

Figure 6:
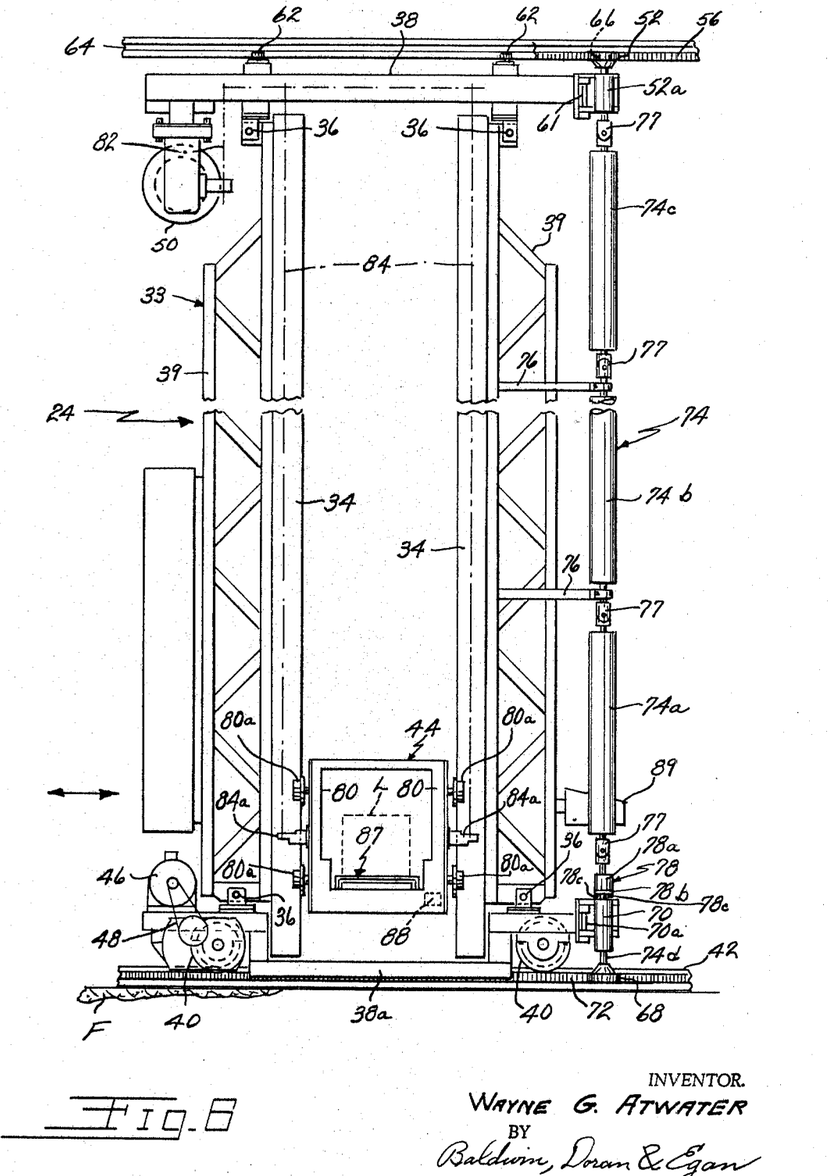
FIGURE 6 is a side elevational view of the load carrier for the warehousing system.

The load carrier 24 may comprise a horizontally movable conveyor frame 33 including generally upright mast structure formed by a pair of generally vertically-extending, preferably hollow track members 34 with the mast structure being pivotally coupled as at 36 to respectively upper and lower carriages 38 and 38a.

Each track may be reinforced and rigidified by truss structure 39 attached thereto. The lower carriage 38a may comprise a generally U-shaped frame (in side elevation) supported on flanged wheels 40, which in turn ride on a guiding rail member 42 extending lengthwise of each of the travel zones and mounted, in the embodiment illustrated, on floor F of the storage area. It will be noted that the carriage 38a is of low-slung design enabling the elevator 44 of the load carrier to move close to ground level. Lower carriage 38a may be driven by means of a preferably reversible electric motor 46 (FIGURE 6) mounted on the carriage 38a, and operably coupled as by means of mechanism 48 to the wheels of the lower carriage, for driving the load carirer along rail 42.

Figure 4:
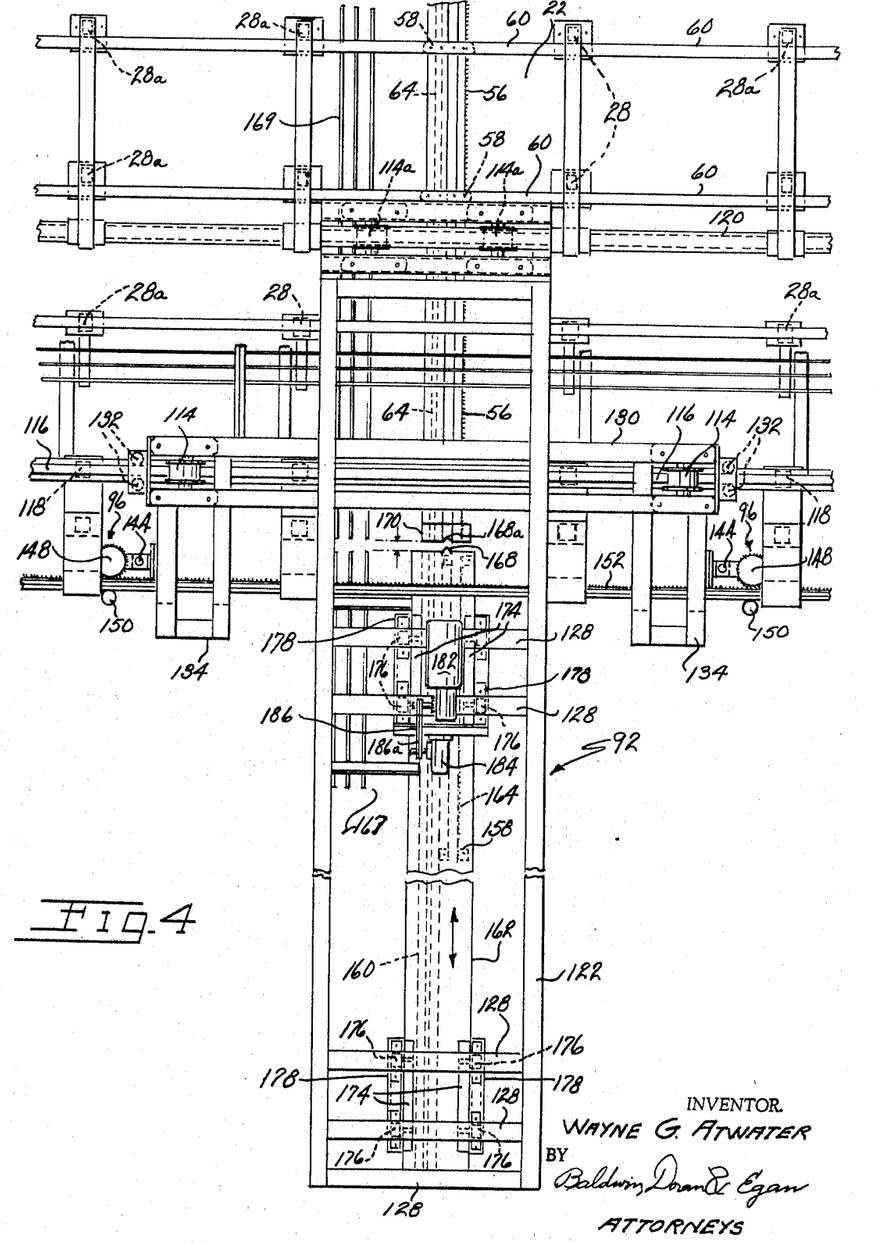
FIGURE 4 is a top-plan view taken generally along the plane of line 4—4 of FIGURE 3 looking in the direction of the arrows.

The upper carriage 38 of the load carrier may include a generally rectangular frame pivoted as aforementioned to the mast structure, and with there being provided a preferably reversible electric motor 50 operably coupled to the elevator for moving the latter vertically on the tracks 34. A gear member 52 may be rotatably mounted as by means of bearing structure 52a on the upper carriage frame, with such gear member coacting in meshing relation with a toothed rack 56 extending lengthwise along each travel zone and being suspended from hanger structure 58 which is posittioned along each of the travel zones of the warehousing system. In this connection, the storage frame may have cross bars 60 extending between the confronting storage bay sections along each aisle and on which the hanger structure 58 may be suspended, as shown for instance in FIGURE 4. Bearing Structure 52a may be pivoted as at 61, to the carriage 38. Spaced idler roller members 62 may be rotatably mounted on the upper carriage 38 and coact with a guiding rail 64 depending from the cross bars 60 for guiding the movement of the load carrier. An idler roller 66 may also be provided on bearing structure 52a in opopsed relation to gear 52, for rolling coaction with the smooth side of the toothed rack for guiding the movement of the upper carriage of the load carrier along the respective travel zone of the storage frame, and for coupling the gear 52 on the upper carriage to the rack 56. Rollers 62 may be adjustably mounted on carriage 38 for lateral adjustment with respect to rail 64 and rack 56.

The lower frame 38a is also provided with a toothed gear 68 rotatably mounted thereon and of the same size and number of teeth as that of the upper gear member 52 with such lower gear member 68 being rotatably mounted in bearing structure 70 which in turn is pivoted as at 70a to the lower carriage 38a. Gear 68 coacts with a toothed rack 72 extending lengthwise along the lower rail in a similar manner as that for the upper gear, and with there also being provided an idler roller 73 rotatably mounted on bearing structure 70 for swinging movement therewith. Roller 73 coacts in rolling engagement with the smooth side of the tooth rack member 72 for coupling the gear 68 to rack 72. A shaft member 74 extends between the upper and lower gears 52, 68 and couples them together, with such shaft member preferably being provided in sections 74a, 74b, 74c and rotatably supported as by means of bracket means 76 on the mast structure of the load carrier. Shaft sections 74a, 74b, and 74c may be coupled to one another and to gears 52, 68 by universal joints 77. Adjustable coupling means 78 is preferably provided for selectively adjusting the rotative position of gear 52 on shaft 74 with respect to gear 68 on the shaft. Means 78 may comprise an upper portion 78a fixed to the adjacent universal joint and a lower disc 78b which is fixed to shaft section 74d mounting gear 68. Bolts 78c fasten disc 78b to coupling portion 78a. Disc 78b may have arcuate slots therein through which bolts 78c extend, thus providing for rotative adjustment of gears 52 and 68 with respect to one another upon loosening of bolts 78c. Portions 78a and 78b of coupling 78 may have serrated confronting surfaces for increasing the resistance to relative rotation with respect to one another when bolts 78c are tightened. It will be seen that the angular adjustment coupling 78 enables precise vertical alignment of the upper and lower load carrier frames to be expeditiously accomplished when the warehousing system is initially set up. It will also be seen that the squaring shaft 74 and associated squaring gears and coacting gear racks will maintain the upper and lower carriage frames as coupled to one another by the pivoted mast structure, in general vertical alignment, so that upon driving of the lower carriage frame 38a by means of its power motor 46, the upper carriage frame 38 will be maintained in synchronism therewith.

The aforementioned elevator 44 may comprise side portions 80 having vertically spaced sets of rollers 80a rotatably mounted thereon, adapted for rolling coaction with the aforementioned tracks 34 of the mast structure, for guiding the vertical movement of the elevator with respect to the conveyor frame 33 of the load carrier.

The aforementioned power means 50 may be suspended from the upper carriage frame 38 of the load carrier and may be suitably coupled to conventional gear reduction mechanism which in turn may be suitably coupled as by means of a chain and sprocket drive 82 to a shaft (not shown) rotatably mounted on the upper carriage frame. Chains 84 may extend down to opposite ends of the elevator, as at 84a, and coact with the latter mentioned shaft for raising and lowering the elevator on the mast structure 34. The other end of the chains 84 may extend into the interior of the associated hollow track members 34 and support vertically movable weights (not shown) thereon. Vertical upward and downward movement of the elevator 44 depends upon the direction of rotation of the motor 50 while the hollow tracks guide the upward and downward movement of the associated weights interiorly of tracks 34, on chains 84.

Mounted on the elevator 44 may be an extractor mechanism 87 which is adapted to move laterally of the elevator either with a load L supported thereon and deposit the load in the selected storage bin of the storage frame, or to move laterally of the elevator and pick up a load that is already in the storage frame and move it back to the desired pick-up and discharge station. The extractor preferably provides an extensible table with the table being extendible in either of the opposed directions transverse to the direction of movement of the load carrier in a traveling zone, so as to locate the extractor within either of the storage bay sections associated with each travel zone, effective to place the extensible table in position to deposit a load into, or remove a load from a selected storage bin in the selected storage bay section. Suitable power means, such as an electric motor 88 (FIG. 6) may be provided operatively coupled to the extractor for actuating the latter. Reference may be had to U.S. Patent 3,283,424 issued Nov. 8, 1966, to Anthony R. Chasar for a more detailed disclosure of a suitable, extendible extractor mechanism.

When depositing a load in one of the storage bins of the storage frame, the elevator 44 and associated extractor 87 may be located opposite the selected storage bin such that as the load is moved into the selected bin, the upper surface of the extractor is slightly above the horizontal flanges of the load supporting rails 30 mounted on the sides of, and defining the bottom extremity of the selected bin. When the load is completely within the confines of the bin, the elevator is lowered slightly to deposit the load onto the supporting angle members and permit retraction of the extractor back to its generally centered position with respect to the elevator.

Conversely, when it is desired to remove a load or article from a bin, the extractor or load supporting means 87 on the elevator is located such that the top surface of the extractor is extended into the bin slightly below the load. Thereafter, the load supporting elevator is raised so as to lift the load off its supporting angles 30 and the extractor is retracted back to its centered condition preparatory to moving the load carrier to its next position in the storage frame.

The programmed operation of load handling cycle for the load carrier may be controlled by an electrical control circuit as disclosed in the copending U.S. patent application Ser. No. 414,048 of Sanford Saul filed Dec. 14, 1964 and entitled Electrical Control Circuit for an Automatic Warehousing System. For example, with the load carrier disposed at a pick-up and discharge station in the system, the load carrier may be automatically moved into the selected aisle and located sequentially opposite two storage bins in either of the storage bay sections or the same storage bay section. At each storage bin during the control interval, the extractor may be actuated so that a load will be deposited into or withdrawn from the bin. For example, a load may be deposited into the selected bin at the first position and a second load withdrawn from a bin at a second position and conveyed back to the aforementioned pick-up and discharge station. Or, the handling cycle may conclude after the load handling at the first position in the system. Console 89, having various controls thereon for actuation by the warehousing operator, may be mounted on the load carrier.

Figure 3:
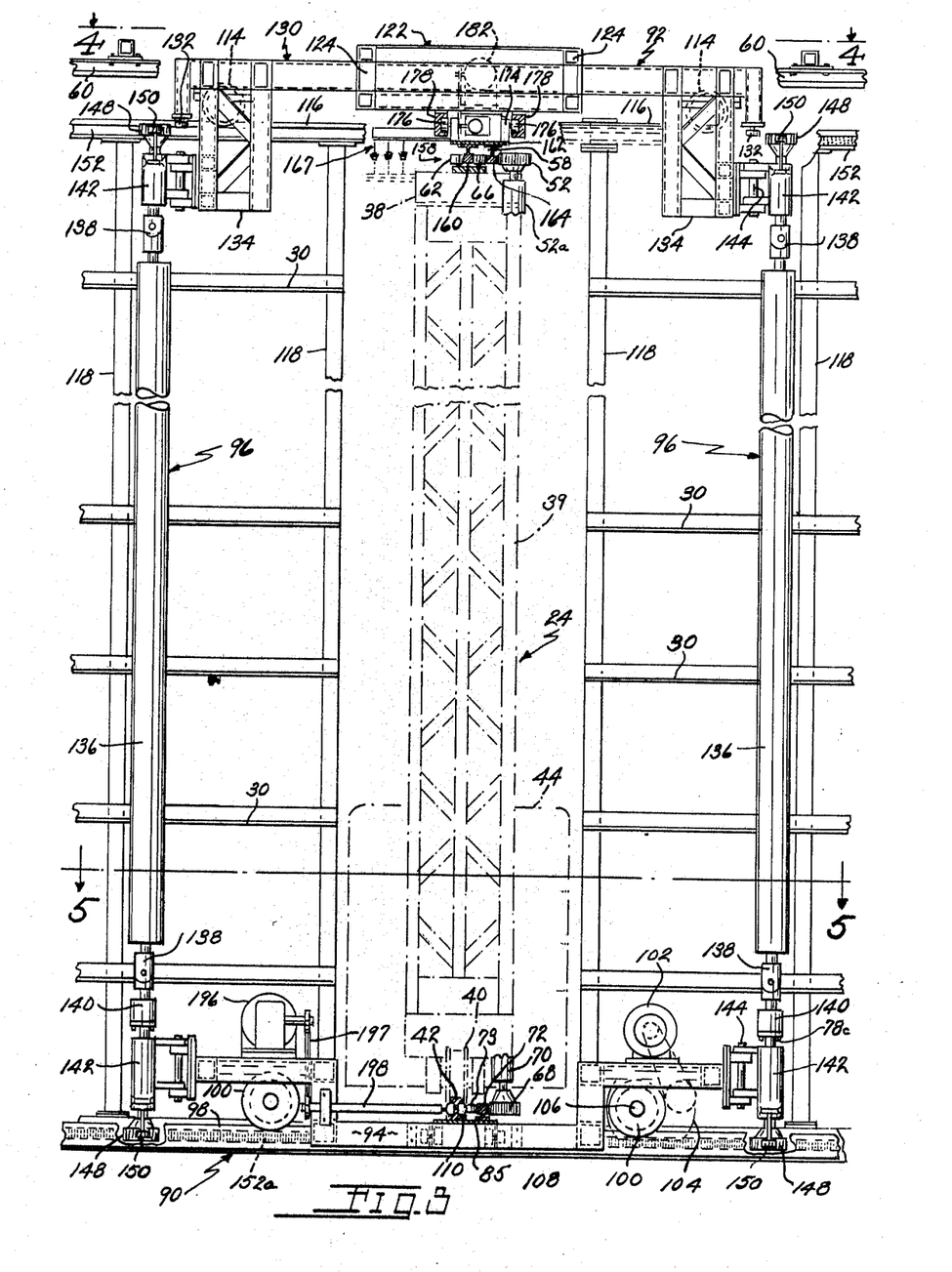
FIGURE 3 is an enlarged end elevational view of the FIGURE 2 transfer frame.

Transfer means 90 is provided for transferring the load carrier from one travel zone and the storage bay sections associated with that travel zone, to another travel zone, whereby the load carrier can expeditiously operate in more than one travel zone, and thus service a considerable number of aisles and associated storage bay sections in the warehousing system. Such transfer means in the embodiment illustrated comprises a transfer framework including an upper frame assembly 92 and a lower frame assembly 94 coupled together by squaring means 96 (FIGS. 2 and 3) which insure that the upper frame assembly will move in synchronism with the lower frame assembly, upon movement of the transfer mechanism alongside the storage frame in its operation of transferring a load carrier from one travel zone to another travel zone.

The lower frame assembly 94 may be mounted upon tracks 98 extending parallel with respect to one another and perpendicular to the direction of extension of the travel zones in the storage area. Tapered wheels 100 may be rotatably mounted on the lower frame assembly and support the transfer mechanism in its movement along the rails. A power means, such as an electric motor 102, may be operatively coupled to a geared speed reducer 104 which in turn is coupled to rotatable shaft 106 to which certain of the wheels 100 are secured, for causing rotation of the wheels, and thus movement of the transfer frame along the rails. The taper on wheels 100 helps to maintain the transfer mechanism centered on rails 98. The lower frame assembly in end elevation (FIG. 3) may comprise a generally U-shaped framework with the downwardly extending or depressed portion 108 of the framework supporting thereon a rail or track member 110 which in turn supports the aforementioned flanged wheel members 40 of the load carrier, when the load carrier is supported on the transfer frame for transmittal from one travel zone to another travel zone. By positioning the guide rail 110 for supporting and guiding the load carrier on the depressed portion 108, the center of gravity of the transfer frame is maintained as low as possible, and in horizontal and vertical alignment with rail 42 in the confronting trave lzone. In this connection it can be seen from FIGURE 2 that the rails 98 for transfer mechanism 90 are positioned in a depressed portion 112 of the warehouse floor area.

The upper frame assembly 92 comprises a framework having flanged wheel means 114, 114a (FIGS. 3 and 4) rotatably mounted thereon, with the wheel means 114 riding on a track 116 which in turn is supported on the leading end posts 118 of the storage frame sections. The other wheels 114a of the upper frame assembly are mounted adjacent the innermost end of frame assembly 92 and are adapted to engage the underside of rail or track member 120 extending lengthwise along the storage frame in parallel relationship with respect to track or rail member 116. In other words, the reaction of the upper frame assembly against the rail 120 is upwardly via wheels 114a, while the reaction of the wheels 114 on the upper frame assembly is downwardly on track 116. As can be best seen from FIGURES 2 and 4, the upper frame assembly 92 comprises a cantilevar portion 122 extending outwardly into overlying relationship with respect to the underlying lower frame assembly 94. Such cantilever portion has, in the embodiment illustrated, side elements 124 of truss construction connected by transversely extending cross elements 128. Such cantilever portion as can be seen, extends inwardly toward the storage frame and mounts the aforementioned wheels 114a on its innermost end. Wheels 114 are spaced a greater distance apart than wheels 114a, and are mounted on transverse framework 130 (FIGS. 2 and 4) secured to cantilevar portion 122. Idler rollers 132 may be mounted adjacent each end of framework portion 130 outwardly of the associated flanged wheel 114, for aiding in guiding the upper frame assembly 92 along tracks 116, 120. Framework portion 130 may have bracket structure 134 secured thereto adjacent each end thereof, for supporting the aforementioned squaring means 96. As can be seen from FIG. 3, a squaring means is preferably provided on both sides of the upper assembly 92. Since both squaring means 96 are identical, only one will be described in detail.

Squaring means 96 in the embodiment illustrated comprises a preferably hollow shaft assembly 136 which is illustrated as being a continuous shaft member, but which might be formed in sections as aforediscussed in connection with the squaring means 74 on the load carrier 24, and which has universal joint means 138 and angular adjustment coupling means 140 included with the shaft assembly in a generally similar manner as aforediscussed in connection with the squaring shaft 74 of the load carrier 24.

The shaft assembly 136 is rotatably mounted in upper and lower bearing means 142 pivotally secured as at 144, to the bracket 134 of the upper frame assembly 92, and pivotally secured at the lower end of the shaft assembly to the lower frame assembly 94. Also rotatably mounted on each bearing member 142 in spaced relationship to an associated gear member 148 secured to the respective end of the squaring shaft 136, may be an idler or roller member 150.

Each of the gears 148 are adapted for meshing coaction with a gear rack 152, 152a extending along the path of travel of the transfer mechanism 90. Gear rack 152 may be supported on the storage frame by means of a bracket 154 which preferably adjustably supports gear rack 152 thereon, while gear rack 152a may be adjustably mounted in the depressed portion 112 of the warehouse floor. The respective idler roller 150 is adapted to engage a smooth side of the respective gear rack, and thus intercouple the gears 148 to the respective gear rack 152, 152a. It will be seen that during movement of the transfer means 90 along its supporting rails 98, that gear 148 on the lower end of each of the squaring shafts 96 will be caused to rotate, thus rotating the associated squaring shaft 136 and causing rotation of gear 148 on the upper end of the squaring shaft. Since the gears are of the same size and the same number of teeth, rotation of the squaring shafts 136 will maintain the upper and lower assemblies 92, 94 of the load transfer means in synchronism. Due to the movable mounting of the squaring means 96, this synchronized movement of the upper and lower assemblies is maintained irrespective of endwise or yawing movement of the transfer mechanism.

Guiding means 158 (FIGURES 3 and 4) is mounted in suspended relation on the upper frame assembly 92 and adapted for guiding coaction with the upper end of the load carrier 24 when the load carrier is disposed in carried relationship on the transfer mechanism 90, for moving a load carrier from alignment with one travel zone to alignment with another selected travel zone. Such guiding means 158 comprises an elongated rail section 160 secured to the underside of a support plate member 162. Also secured to the underside of support plate 162 in laterally spaced relation to rail section 160 is a gear rack section 164, with such gear rack section being adapted for meshing relation with the upper gear member 52 on the squaring shaft means 74 of the load carrier, when the load carrier is supported on and carried by the transfer mechanism 90. As can be seen, since the squaring shaft 74 of the load carrier is disposed adjacent the rearward end thereof, the gear rack 164 does not have to extend outwardly along the cantilever portion 122 of the upper frame assembly 92 for the complete length of the cantilever portion. The aforementioned idler roller 64 rotatably mounted on the bearing structure 52a of the squaring mechanism 74 of the load carrier 24 is adapted to engage the inner smooth side of gear rack section 164. Plate 162 may also support electrical energy conductor assembly 167 comprising conventional buss bar sections which are adapted for carrying current to the load carrier 24 when the latter is carried by the transfer mechanism.

In accordance with the present invention, the guiding means 158 including the support plate 162 and attached rail section 160 and rack section 164 and conductor assembly 167, is shiftable toward and away from the storage frame, so that the guiding means 158 can be positively abutted against the guiding means supported on the transverse members 60 of the storage frame, and including the gear rack 56 and the rail 64, and the conductor assembly 167 can be coupled in electrical energy transmitting relation to the buss bars 169 extending lengthwise of the respective travel zone. As can be best seen from FIGURE 4, the support plate 162 of the guiding means on the transfer mechanism has a lug 168 thereon which is adapted to be received in a slot 168a of a plate 170 attached to the gear rack 56 and rail 64. In order to provide for the shiftability of the guiding means 158 on the transfer mechanism, the support plate 162 is provided with spaced brackets 174 thereon rotatably mounting wheels 176, which wheels are received in channel-like guideways 178 secured to the cantilever portion 122 of upper frame assembly 92. As can be seen from FIGURE 4, the amount of shiftability of the guide means 158 does not have to be very great, and only sufficient to permit detachment of lug 168 from the complementary slot 168a. Accordingly, once the latter is accomplished, then the transfer mechanism is completely separated from any interlocking connection with the storage frame and such transfer mechanism can be moved along its tracks 98 to transfer a supported load carrier 24 from alignment with one traveling zone or storage aisle into alignment with another traveling zone or storage aisle, after which the guiding means 158 and associated conductor assembly 167 on the transfer mechanism can be once more shifted into interlocking coaction with the guiding means and associated buss bars on the upper cross members 60 of the storage frame in the selected aisle, with such guiding means in said selected aisle including the aforementioned gear rack 56 and the rail 64 which operates to guide and align the load carrier in its movement in the selected aisle.

Power means which may include an electric motor 182, may be mounted on the cantilever portion 122 and which may be operatively coupled to a conventional ball screw jack mechanism 184, and as by means of the gear and chain drive 186, for power shifting of the guiding means 158 on the upper frame assembly. It will be seen that upon rotation of sprocket 186a, due to driving of the electric motor 182, the ball screw pack 184 is caused to extend or retract, with the jack 184 coacting between the upper cantilever portion 122 of the upper frame assembly and the movable support plate 162 of guiding means 158, to cause movement of the guiding means 158 and associated conductor assembly 167 toward and away from the storage frame, depending upon the direction of rotation of motor 182.

Figure 5:
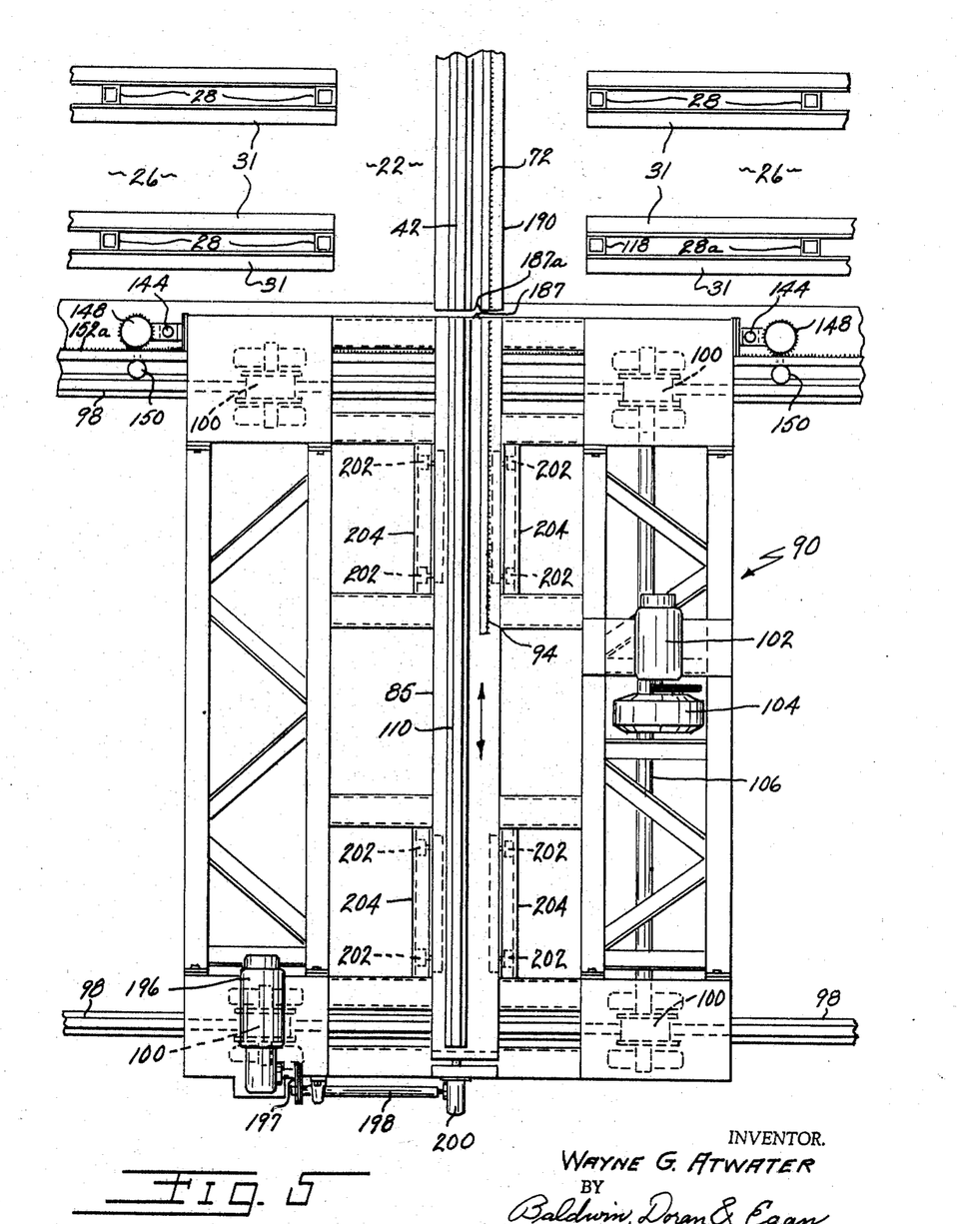
FIGURE 5 is a sectional view taken generally along the plane of line 5—5 of FIGURE 3 looking in the direction of the arrows.

In like manner the lower supporting and guiding rail 110 which, as aforementioned, supports the load carrier 24 on the transfer mechanism, is mounted on a support plate 185 which support plate is likewise shiftable toward and away from the storage frame area, and which preferably has a lug 187 on its inner end for interlocking coaction with a complementary recess 187a in the plate 190 supporting the guiding rail and gear rack structure 42 and 72 respectively on the bottom of each aisle in the storage frame. The plate 185 on the transfer mechanism also supports a gear rack section 194 which is adapted for meshing relationship with lower gear 68 on the squaring means 74 of the load carrier, when the load carrier is carried on the transfer mechanism. Plate 185 is shiftable on the transfer mechanism toward and away from the storage area by an electric motor 196 operably coupled as by means of sprocket and chain drive 197, and shaft drive 198 to a conventional ball screw jack 200 which coacts between the lower frame assembly 94 and the movable plate 185, and in a generally similar manner as aforedescribed in connection with the shiftability of the upper plate 162 on the upper frame assembly of the transfer mechanism. The plate 185 may be provided with rotatable wheels 202 (FIGURES 3 and 5) thereon which ride in angle guides 204 secured to the lower frame assembly 94, and in a similar manner as aforediscussed in connection with the plate 162, for shifting plate 185 and the supported guiding components including track section 110 and gear section 194. Motors 196 and 182 are adapted to be driven in synchronism so that shifting of the guide means on the upper and lower frame assemblies of the transfer mechanism occurs simultaneously, to interlock or detach such guiding means on both frame assemblies simultaneously. It will be seen that when the plates 162, 185 have been shifted toward the storage frame so as to cause interlocking coaction with the guiding means on the top and bottom of the selected travel zone, that the transfer mechanism is positively interlocked and aligned with the selected travel zone, providing for expeditious movement of the carried load carrier from the transfer mechanism onto the guiding means in the selected travel zone and coupling conductor assembly 167 to buss bars 169.

From the foregoing discussion and accompanying drawings it will be seen that the invention provides a novel warehousing system comprising a plurality of storage zones with storage bays disposed along the travel zones together with a load carrier for depositing loads into and removing loads from the respective storage bays in the selected travel zone, and with a novel arrangement of load transfer means for moving the load carrier from alignment with one travel zone into alignment with another travel zone. The invention also provides a arrangement of the latter discussed type wherein the transfer means includes means thereon for guiding the load carrier when the load carrier is disposed on the transfer means, together with a novel arrangement for shifting the guiding means on the transfer means toward and away from the respective guiding means in the selected travel zone of the warehousing system, for coupyling such guiding means together.

The terms and expressions which have been used are used as terms of description and not of limitation, and there is no intention in the use of such terms and expressions of excluding any equivalents of any of the features shown or described or portions thereof, and it is recognized that various modifications are possible within the scope of the invention.

What is claimed is:

1. In a warehousing system comprising a storage frame including a plurality of storage bays, said storage bays defining a plurality of travel zones along which the storage bays are disposed, a load carrier movable in said travel zones, said load carrier including means thereon for depositing loads into and removing loads from the respective storage bays, means located in each of said travel zones for guiding said load carrier in its movement, and means for transferring said load carrier from one travel zone to another of said travel zones, the last-mentioned transfer means including means for guiding said load carrier thereon when said load carrier is disposed on said transfer means, said transfer means comprising a cantilever mounted upper assmbly and a lower assembly, means mounting said cantilever upper assembly on said storage frame whereby substantially all of the weight of said upper assembly is supported by said storage frame, means mounted on one of said assemblies for driving the same, and means extending between and connecting said upper and lower assemblies and responsive to said drive meas for causing concurrent synchronized movement of said assemblies during movement of said transfer means, said means which extends between and connects said upper and lower assemblies forming the sole means between said assemblies for transmitting the drive from said one assembly to the other of said assemblies.

2. A system in accordance with claim 1 including means for shifting said guiding means on said transfer means toward and away from the respective guiding means of the selected travel zone.

3. A system in accordance with claim 1 wherein said guiding means on said transfer means includes traction means supporting the last mentioned guiding means on said transfer means for shiftable movement with respect thereto.

4. A system in accordance with claim 3 including power means for shifting said last mentioned guiding means with respect to said transfer means.

5. A system in accordance with claim 3 including means on said guiding means in each of said aisles adapted for interlocking coaction with means on said guiding means of said transfer means, for interlocking said guiding means with respect to ane another upon predetermined shifting movement of said guiding means on said transfer means.

6. A system in accordance with claim 1 wherein said upper assembly comprises a supporting carriage section including wheels mounted for movement on said storage frame in a direction generally transverse to the direction of extension of said travel zones, and a cantilever section supported by and extending outwardly from said carriage section and mounting said guiding means of said transfer means thereon for guiding said load carrier when the latter is disposed on said transfer means, the inner end of said cantilever section having traction means thereon adapted for upward abutting coaction against track means on said storage frame.

7. A system in accordance with claim 1 wherein said load carrier comprises an upper section and a lower section, means connecting said sections and coacting therewith and with means on said storage frame for causing concurrent synchronized movement of said upper and lower load carrier sections during movement of the load carrier.

8. A system in accordance with claim 1 wherein said load carrier comprises a horizontally movable conveyor frame including upper and lower sections and generally vertically extending track structure attached to said sections, an elevator movably mounted for vertical movement on said track structure, and a laterally extensible extractor mechanism mounted on said elevator for depositing loads into and removing loads from said storage frame, and including means coacting between said sections and means on said storage frame for causing concurrent synchronized movement of said load carrier sections during movement of said load carrier.

9. A system in accordance with claim 8 wherein said means for causing concurrent movement of said upper and lower load carrier sections comprises a rotatable shaft means extending generally vertically and mounted on said load carrier, vertically spaced gear assemblies coupled to said load carrier and coacting with said shaft means whereby rotation of the gear of one of said assemblies causes concurrent rotation of the gear of the other of said assemblies, and said guiding means of the respective travel zone including toothed racks on respectively the upper portion of said storage frame and adjacent ground level coacting with said gears of said assemblies whereby said shaft means is caused to rotate upon movement of said load carrier, thereby causing concurrent movement of said upper and lower sections of said load carrier upon horizontal movement of said load carrier in the respective travel zone.

10. A system in accordance with claim 1 wherein said means for causing concurrent movement of said upper and lower assemblies of said transfer means comprises vertically spaced rotatable driving members adapted for synchronized slippage free rotatable engagement with coacting means on said storage frame and adjacent ground support for said storage frame respectively, whereby horizontal movement of said transfer means maintains said upper and lower assemblies of said transfer means in vertically aligned relation with respect to one another.

11. A system in accordance with claim 2 including power means for actuating said guiding means on said transfer means, said power means comprising a power actuated rotatable screw jack coacting with the last mentioned guiding means for shifting the latter upon actuation of said screw jack.

12. A system in accordance with claim 2 including a buss bar structure associated with each respective travel zone for supplying electrical energy to said load carrier, and wherein said transfer means includes a buss bar assembly adapted for automatic coupling to said buss bar structure upon movement of said guiding means on said transfer means into coaction with said guiding means of the selected travel zone.

13. A system in accordance with claim 10 including a generally vertically extending shaft assembly coupled to said driving members, said shaft assembly comprising universal joint means for providing for a relative movement of said shaft assembly with respect to said driving members, and means for axially adjusting said shaft assembly.

14. A system in accordance with claim 6 wherein said wheels on said carriage section are spaced laterally from the respective side of said cantilever section to stabilize the mounting of said upper assembly on said storage frame.

15. A system in accordance with claim 2 wherein said guiding means of each travel zone comprises rail and gear rack means spaced laterally from one another and extending in the direction of extension of the respective travel zone, and said guiding means on said transfer means comprises rail and gear rack section means spaced laterally with respect to one another and shiftably mounted as a unit on said transfer means.

16. A system in accordance with claim 15 wherein said rail and gear rack section means are secured to a support member which includes rollers received in guideways on said transfer means, for movably mounting said guiding means on said transfer means.

17. A system in accordance with claim 1 wherein said means extending between and connecting said upper and lower assemblies, includes adjustable means providing for vertical alignment of said upper and lower assemblies with respect to one another.

18. A system in accordance with claim 17 wherein said connecting means comprises a generally vertically extending shaft assembly having vertically spaced gears secured thereto for rotation therewith, said gears being adapted for meshing relation with parallel extending stationary gear rack means for maintaining concurrent synchronized movement of said upper and lower assemblies upon horizontal movement thereof, and wherein said adjustable means comprises a coupling providing for selective rotary adjustment of the position of the gears with respect to one another, and the rotary position of at least one of the gears with respect to the shaft assembly.

19. A system in accordance with claim 1 including means thereon for interlocking said transfer mechanism to said storage bays for positive alignment of said transfer means with a selection of the travel zones.

20. A system in accordance with claim 19 including plural interlocking means coacting with respectively said upper and lower assemblies of said transfer means.

References Cited

FOREIGN PATENTS 1,317,172  12/1962  France.

GERALD M. FORLENZA, Primary Examiner

RAYMOND B. JOHNSON, Assistant Examiner

U.S. Cl. X.R.

104—48; 214—88